UNITED STATES PATENT OFFICE.

WILLIAM HOWARD TASKER, OF TAVISTOCK SQUARE, AND THOMAS JOHN JONES, OF HANOVER SQUARE, ASSIGNORS TO THE PRIMARY BATTERY COMPANY, (LIMITED,) OF HANOVER SQUARE, COUNTY OF MIDDLESEX, ENGLAND.

MANUFACTURE OF PLATES OR ELEMENTS FOR VOLTAIC BATTERIES.

SPECIFICATION forming part of Letters Patent No. 357,642, dated February 15, 1887.

Application filed November 8, 1886. Serial No. 218,320. (No model.) Patented in France January 4, 1886, No. 173,315; in Belgium January 5, 1886, No. 71,509, and in Italy June 30, 1886, XX, 19,779, XXXIX, 164.

*To all whom it may concern:*

Be it known that we, WILLIAM HOWARD TASKER, at present residing at 18 Upper Woburn Place, Tavistock Square, in the county of Middlesex, England, electrician, and THOMAS JOHN JONES, at present residing at 12 Princes Street, Hanover Square, in the county of Middlesex, England, electrician, have invented new and useful Improvements in the Manufacture of Plates or Elements for Voltaic Batteries, of which the following is a full, clear, and exact description, and for which we have obtained a patent in France for fifteen years, dated January 4, 1886, No. 173,315; Belgium for twenty years, dated January 5, 1886, No. 71,509, and Italy for fifteen years, dated June 30, 1886, Nos. 19,779 and 164, Vols. 20 and 39.

This invention relates to the manufacture of plates or elements for voltaic batteries; and it has for its object to produce porous and yet hard coherent masses of any desired form, mainly composed of oxide of lead, and capable of serving as efficient elements in a battery when reduced to porous metallic lead or converted into peroxide of this metal.

This invention consists, essentially, in a process of mixing together and molding while in a dry state the materials of which the plates are composed, and then steaming the mass while in the mold, whereby the soluble constituents of the mixture are dissolved and rendered active, so as to cause the mass to "set" or bind together in the mold, and at same time leave interstices, which increase the porosity of the mass.

In carrying out the invention we take an oxide of lead, preferably the monoxide, (litharge,) which we use alone when the plate is to be used as a positive element only, and which in other cases we preferably intimately mix with about five per cent. to six per cent. of inert porous material—such as ground white porous earthenware free from iron, or ground pumice-stone, or kieselguhr—and thoroughly incorporate therewith, while in a dry pulverulent state, a certain proportion of one of the salts hereinafter mentioned while the same is in a crystalline form. This dry pulverulent mixture is then placed in a mold, consolidated by pressure, and while in the mold steamed by being exposed to a jet of steam or inclosed in a steam-chamber. The steam, becoming condensed, dissolves the salt throughout the mass, and so causes it to combine with the oxide of lead, which is caused to set in the mold in the form of a dense and coherent plate having the desired degree of porosity. This is usually done by directing a jet of steam upon one face of the mass contained in the mold until action appears to have ceased, and in order to insure the complete "setting" of the lead oxide the mass is afterward thoroughly impregnated with a half-saturated solution of the salt of ammonia. The mass is then allowed to drain for a few minutes, removed from the mold, and dried in the air or by heat. The mass when dry is ready to be at once converted by electrolysis either into spongy metallic lead or into peroxide of lead, (directly or indirectly,) according as it is to be used as the positive or the negative element in a cell. In order, however, to facilitate this electrolytic conversion of the mass into peroxide of lead, it is preferable to immerse the same in a hot clear solution of chloride of lime, whereby the mass is superficially peroxidized, or, better still, to use a mixture of about twenty-five per cent. of peroxide of lead in the form of fragments or dust with the litharge, in lieu of the inert porous material before referred to, in which case the superficial peroxidation is unnecessary.

The salt we prefer to use is ammonic sulphate, in the proportion of about five per cent. of the weight of lead oxide used; but we may use instead about the same proportion of ammonic chloride, carbonate, chromate, or phosphate, or of sodic or potassic chloride, sulphate, or chromate that is a salt of an alkaline metal. When a chloride is used either in the mixture or subsequently, the plate should be well washed, to remove, as far as possible, all traces of chloride before the electrolytic conversion is effected. In order to render the plates more conductive at the point where contact is to be effected, we prefer, when inert porous substances enter into the composition of the plate, to face the parts in question with a mixture of the litharge and the salt without any inert and consequently non-conducting material before compressing and steaming in the mold.

In order to harden the plates, we generally find it advisable to mingle a little glycerine with the steam by causing the steam-jet to act as a spray-producer upon a mixture of three parts of glycerine to one of water.

Having now particularly described and ascertained the nature of the said invention, and in what manner the same is to be performed, we declare that what we claim is—

1. The herein-described process of producing porous and coherent masses or plates mainly composed of oxide of lead, which process consists in mixing together an oxide of lead, preferably the monoxide, (litharge,) and a salt of an alkaline metal while the said materials are in a dry condition, and then steaming the dry mixture while in the mold, as and for the purpose specified.

2. The manufacture of porous and coherent masses or plates mainly composed of oxide of lead, which process consists in mixing together monoxide of lead, (litharge,) peroxide of lead, and a salt of an alkaline metal while the said materials are in a dry state, and then steaming the dry mixture while in the mold, as and for the purpose specified.

The foregoing specification of our improvements in the manufacture of plates or elements for voltaic batteries signed by us this 27th day of July, 1886.

WILLIAM HOWARD TASKER.
THOMAS JOHN JONES.

Witnesses:
WILMER M. HARRIS,
WALTER J. SKERTEN,
*Both of No. 17 Gracechurch Street, London, E.C.*